March 25, 1958
E. A. WAGNER
2,827,715
LOGGING APPARATUS
Filed Sept. 23, 1955
2 Sheets-Sheet 1
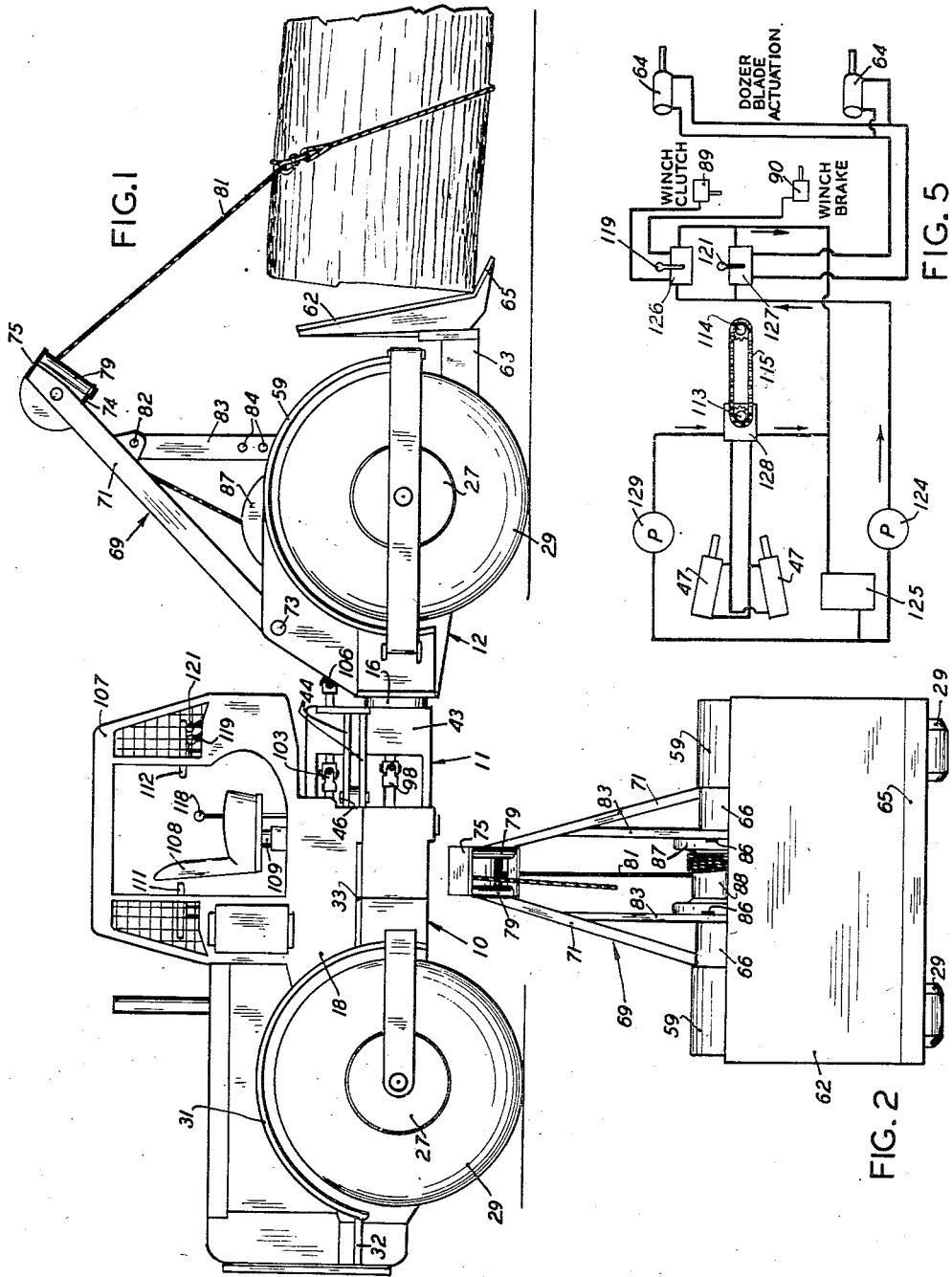
INVENTOR.
ELMER A. WAGNER
BY
Buckhorn and Cheatham
ATTORNEYS

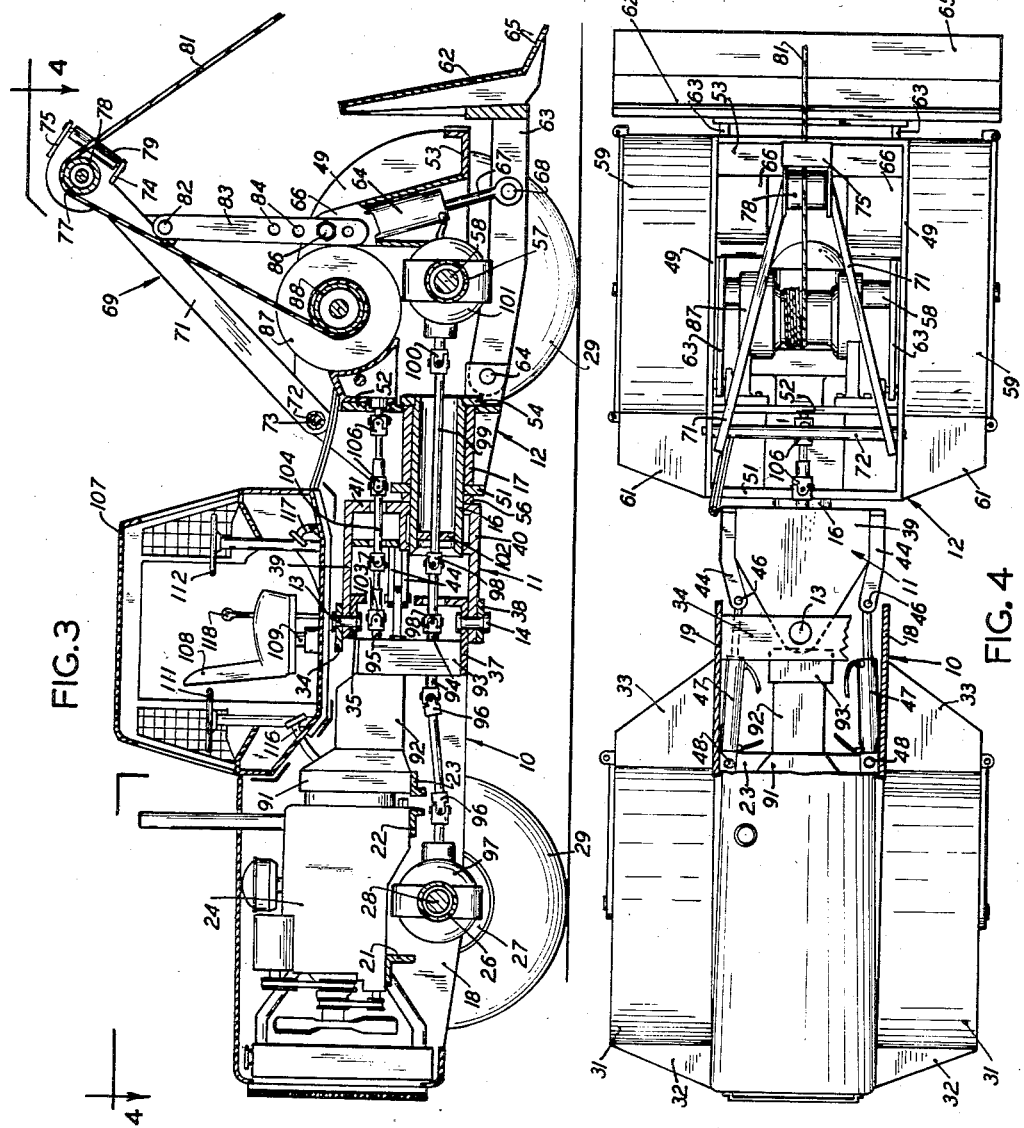

.# United States Patent Office 2,827,715
Patented Mar. 25, 1958

2,827,715
LOGGING APPARATUS

Elmer A. Wagner, Portland, Oreg., assignor to Wagner Tractor, Inc., Portland, Oreg., a corporation of Oregon Application September 23, 1955, Serial No. 536,177

3 Claims. (Cl. 37—117.5)

This invention relates to logging apparatus, and more particularly to a combined bulldozer and log yarding or skidding machine in which a dozer blade on a tractor is employed in conjunction with a winch and an arch mounted on and carried by the tractor to more effectively assemble and transport logs in a logging operation.

In many logging operations, skidding or yarding of logs, i. e. gathering logs in the woods and bringing them to a central point at which they may be loaded on trucks or railroad cars or otherwise carried to a sawmill, is largely accomplished by employing tractors, usually of the track-laying type. Such tractors are usually provided with a winch with which logs may be pulled to the tractor. The logs may then be dragged to a central point by the tractor alone or, alternatively, a separate arch mounted on wheels or a track-laying structure may be attached to the rear of the tractor and a winch line trained over a fair-lead on the arch in order to lift the front ends of the logs during transport. Such tractor may be fitted with a dozer blade or a separate bulldozer may be employed to build skidding roads. There is, however, no conjoint use of a dozer blade and a winch in a log gathering operation, and any arch employed is a separate vehicle pulled by the tractor and reducing its maneuverability.

In accordance with the present invention, a single unitary machine embodying a dozer blade, an arch having a fair-lead positioned above the dozer blade, and a winch for a line trained over the fair-lead is employed. The machine of the present invention is preferably of the type having wheels provided with large tires with heavy treads, all of the wheels being driven from an engine mounted on the tractor, but certain advantages of the invention can be realized by employing tractors of the track-laying type. With the machine of the present invention, the dozer blade is not only employed for road building and road clearing operations, but is employed to hold the machine stationary during log gathering operations in which the winch and arch are employed, and is also employed to facilitate the placing of choker lines or the winch line about a log as well as in assisting in maintaining the front ends of the logs off the ground and preventing them from becoming entangled with obstructions during transport.

It is, therefore, an object of the present invention to provide an improved logging apparatus facilitating the skidding or yarding of logs.

Another object of the invention is to provide a logging apparatus in which a dozer blade is employed in conjunction with a winch and an arch having a fair-lead above the dozer blade to facilitate the skidding or yarding of logs.

A further object of the invention is to provide a self-propelled log skidding or yarding machine which is capable of being employed in rough terrain to build logging roads and also to gather and transport logs to a central station or yard in a more efficient manner.

Other objects and advantages of the invention will appear in the following description of a preferred embodiment thereof shown in the attached drawings of which:

Fig. 1 is a side elevation of the apparatus of the present invention showing a portion of a log in position for transport;

Fig. 2 is a front elevation of the working end of a machine only, with the cab and other portions of the machine omitted for clarity;

Fig. 3 is a longitudinal, vertical section of the apparatus taken approximately along the centerline of the machine;

Fig. 4 is a horizontal section taken on the line 4—4 of Fig. 3; and

Fig. 5 is a diagrammatic view of the hydraulic system showing certain of the controls of the machine.

Referring more particularly to the drawings, the apparatus of the present invention comprises a tractor having an articulated frame including a front frame portion 10, an intermediate frame portion 11 and a rear frame portion 12. The intermediate frame portion 11 is pivotally secured to the front frame portion 10 by pivot pins 13 and 14 for pivotal movement about a vertical axis to provide for steering of the apparatus, and the rear frame portion 12 is pivotally secured to the intermediate frame portion 11 by concentric sleeves 16 and 17 forming parts of the intermediate frame portion 11 and the rear frame portion 12, respectively. The front frame portion 10 includes longitudinally extending side pieces 18 and 19 secured together by crosspieces 21, 22, and 23 which also support an engine 24 which may be of any suitable type of internal combustion engine such as a diesel. A front axle housing 26 is supported in the side pieces 18 of the front frame portion and has front wheels 27 journaled on its ends, the wheels 27 being driven through axle shafts 28. The wheels are provided with large pneumatic tires 29 which are preferably provided with heavy ribbed treads (not shown). The front frame portion is also provided with heavy arched fenders 31 over the wheels 27 which along with bracing plates 32 and 33 form stress resisting members of the frame.

The front frame portion 10 also has upper cross-members 34 and 35 and lower cross-members 37 and 38, all extending between the side frame members 18 at the rear end thereof. These cross-members are provided with bores for the pivot pins 13 and 14 which, as stated above, pivotally connect the intermediate frame portion 11 to the front frame portion 10 for relative pivotal movement about a vertical axis. Thus, the intermediate frame portion 11 has a top member 39 which extends forwardly between the cross-members 34 and 35 and a bottom member 40 which extends forwardly between the cross members 37 and 38, the top and bottom members 39 and 40 being provided with bores to receive the pivot pins 13 and 14. The top and bottom members 39 and 40 of the intermediate frame portion are of generally triangular shape with their bases connected together at the rear of the intermediate frame portion by a vertically and laterally extending member 41. The member 41 also has the sleeve 16 rigidly secured therein. The intermediate frame portion 11 also has vertically extending side members 43 most clearly shown in Fig. 1, to which rigidly secured steering arms 44 pivotally connect at 46 to the piston rods of hydraulic cylinders 47 which are in turn pivotally connected at 48 to the crosspiece 23 of the front frame portion 10. The cylinders 47 and steering arms 44 are positioned at opposite sides of the front and intermediate frame portions so that introduction and withdrawal of hydraulic fluid into and from opposite ends of the cylinders provides for steering the tractor.

The rear frame portion 12 includes longitudinally extending side members 49 connected together by crosspieces 51, 52 and 53, the cross-member 51 at the front of the rear frame portion having rigidly secured thereto the sleeve 17 which surrounds and is journaled for pivotal movement on the sleeve 16 carried by the intermediate frame portion 11. A collar 54 removably secured on the rear end of the sleeve 16 and a spacer member 56 on the sleeve 16 adjacent the cross-member 41 of the intermediate frame portion 11 maintain the sleeve 17 in position longitudinally of the sleeve 16. The rear frame portion 12 may thus pivot about the longitudinal axis of the sleeve 16 with respect to the intermediate frame portion 11. The rear frame portion 12 is provided with a rear axle housing 57 rigidly secured in the side frame members 49. The axle housing 57 also has wheels 27 journaled thereon driven from a rear axle shaft 58 and also having tires 29 thereon. The structure just described enables the tractor to be driven over rough terrain with all four wheels in effective driving engagement with the ground at all times.

The rear frame portion 12 of the machine also has arched fenders 59 of heavy material over the rear wheels which in conjunction with bracing plates 61 also form stress resisting members of the rear frame portion. The rear frame portion of the machine also carries a dozer blade 62 secured to side arms 63 which are pivoted at 64 to the side frame members 49. The dozer blade 62 is raised and lowered by hydraulic cylinders 64 mounted in housings 66 secured to the side frame members 49 of the rear frame portion. These housings open downwardly and the upper ends of the cylinders 64 are pivotally secured to the side frame members 49 in the upper portions of the housings by pivots (not shown). The hydraulic cylinders 64 have piston rods 67 extending downwardly therefrom and pivotally connected at 68 to the side arms 63 carrying the dozer blade 62. It will be apparent that the introduction and discharge of hydraulic fluid into and from the opposite ends of the hydraulic cylinders 64 will raise and lower the dozer blade 62. The dozer blade is preferably of the type shown, i. e. one having a lower edge portion 65 projecting outwardly and downwardly at an angle to the main vertically extending portion of the blade.

The rear frame portion 12 also carries an arch 69 of approximately triangular construction having side members 71 connected together at their lower ends by a tubular cross-member 72 journaled on a cross-shaft 73 extending between the side frame members 49. The side members 71 of the arch 69 converge upwardly and rearwardly and are connected together at their upper ends by vertically spaced cross-members 74 and 75. A horizontal shaft 77 extends between the upper ends of the side members 71 and has a roller 78 journaled thereon. Also, vertically extending side rollers 79 are journaled on shafts extending between the upper and lower cross-members 74 and 75, the structure just described providing a fair-lead for a winch line 81. The arch 69 is adjustable for adjusting the height of the fair-lead. That is to say, the side members 71 of the arch are pivotally connected at 82 to downwardly extending side links 83 adjacent the upper ends of the side members 71. The links 83 are provided with a series of holes 84 spaced longitudinally of the links adjacent their lower ends. The lower ends of the links 83 fit against the inner surfaces of the housings 66 for the hydraulic cylinders 64 and are detachably secured thereto by bolts 86 screw-threaded into the housings 66. The bolts 86 may be removed, the arch raised or lowered by pivoting about the shaft 73 and the bolts reinserted to hold the arch in adjusted position.

The rear frame portion 12 of the tractor also has a winch 87 supported thereon. The winch may be attached to the cross-member 52 and be provided with a drum 88 upon which one end of the line 81 is wound. The winch may be of any known or suitable type of mechanically driven hydraulic controlled winch, for example, it may have a hydraulically actuated clutch and brake (not shown), the hydraulic actuators 89 and 90 for such clutch and brake being shown diagrammatically in Fig. 5. Both the tractor itself and the winch 87 are driven from the engine 24. The engine 24 is provided with a conventional clutch in the housing 91 and a conventional transmission in the housing 92. Gear and chain drives, the details of which form no part of the present invention, are positioned in the housing 93 and provide power output shafts 94 and 95. The power output shaft 94 extends from both the front and rear of the lower portion of the housing 93 and the power output shaft 95 extends from the upper rear portion of the housing 93 and is independently driven, i. e. it can be driven from the engine 24 irrespective of whether the shaft 94 is driven. The front wheels 27 of the tractor may be driven from the shaft 94 through universal joints 96 and a differential 97 from which the axle shafts 28 are driven. In a similar manner, the rear wheels of the tractor are driven from the shaft 94 through universal joints 98, a shaft 99 extending through the sleeve 16, another universal joint 100, and a differential 101 from which the axle shafts 58 are driven. The shaft 99 has its front end journalled in a bearing 102 supported in the interior of the sleeve 16. The winch 87 may be driven from the shaft 95 through universal joints 103, a shaft 104 journaled in bearings in the intermediate frame portion 11 and universal joints 106, the rear one of which is connected to the winch 87.

The universal joints 98 permit pivoting of the intermediate frame portion 11 with respect to the front frame portion 10 about the pivot pins 13 and 14 without interrupting drive to the rear axle shafts 58. The universal joint 100 permits any misalignment of the shaft 99 with the differential 101 which may occur due to rotation of the sleeve 17 about the sleeve 16 or any other cause, the bearing 102 being of the self-aligning type. The universal joints 103 permit pivoting of the intermediate frame portion 11 with respect to the front frame portion 10 without interrupting drive to the winch 87 while the universal joints 106 provide for pivoting of the rear frame portion 12 about the axes of the sleeve 16 with respect to the intermediate frame portion 11 without interrupting the drive to the winch 87. It is apparent that the arrangement of shafts and universal joints shown enables the intermediate frame portion 11 to pivot with respect to the front frame portion 10 about a vertical axis through the pivot pins 13 and 14 for purposes of steering and also enables the rear frame portion 12 to pivot with respect to the intermediate frame portion 11 about a horizontal axis through the sleeve 16 so that all four wheels can be driven and remain in contact with the ground at all times even on rough terrain.

The front frame portion 10 carries the operator's cab 107 which, as shown in Figs. 1 and 3, extends rearwardly over the intermediate frame portion 11. The cab 107 is provided with a rotatable seat 108 mounted upon a central support 109 so that the operator may face both front and rear. The cab is provided with both a front steering wheel 111 and a rear steering wheel 112. The steering wheels have steering shafts 113 and 114, respectively, suitably connected together, for example, by a chain 115 as shown diagrammatically in Fig. 5. The cab is also provided with front and rear clutch pedals 116 and 117, respectively, also suitably connected together by means (not shown), as well as other conventional truck controls such as brake and throttle pedals (not shown) and a gear shift lever 118 for the transmission. The cab 107 also contains a winch control lever 119 and a dozer blade control lever 121 (Fig. 1).

The hydraulic system illustrated diagrammatically in Fig. 5 may include a pump 124 supplying hydraulic fluid under pressure from the storage tank 125 to the valve 126 operated by the winch control lever 119. The valve 126 may be of any suitable or known type which will supply hydraulic fluid to both a clutch actuator cylinder 89 and to a brake release cylinder 90 when the lever 119 is moved in one direction from its neutral position, which will supply fluid to the brake release cylinder only when the lever 119 is moved in the opposite direction and which will exhaust such fluid from the clutch actuator and brake release cylinders when the lever is returned to its neutral position. That is to say, such hydraulically controlled winches conventionally contain a brake which is normally engaged but which is released when the clutch is engaged so as to wind line on the drum and which can be independently released to pay out line. The winch 87 may thus be completely controlled from one lever 119.

The pump 124 may also supply hydraulic fluid to a control valve 127 operated by the dozer blade control lever 121 to supply such fluid to the cylinders 64 operating the dozer blade 62. The valve 127 may also be of any known or suitable type which will supply fluid to one end of the cylinders 64 when the lever is moved in one direction from a neutral position, which will hold the fluid in such cylinders when the lever is returned to a nuetral position, and which will supply fluid to the other end of the cylinders when the lever is moved in the other direction from its neutral position, such valve also exhausting fluid from the end of the cylinders opposite that to which fluid is supplied. The dozer blade can therefore be raised, lowered or held in a desired position under control of a single lever 121.

The steering wheels 111 and 112 through their shafts 113 and 114 may actuate a hydraulic steering valve 128 of any known or suitable type to alternatively supply hydraulic fluid to and exhaust it from the opposite ends of the steering cylinders 47, depending upon the direction in which the shaft 113 is turned. The steering valve is of the follow-up type conventional in hydraulic steering systems. A separate pump 129 may withdraw fluid from the storage tank 125 and supply it to the valve 128, exhausted fluid being delivered back to the tank 125 from all of the valves 126, 127 and 128.

In operation the machine of the present invention may be employed for a variety of purposes in logging operations. It may be employed in a manner similar to a conventional bulldozer for making or repairing logging roads. When used as a bulldozer, the operator's seat will ordinarily face in the direction shown in the drawing and, by employing the conventional truck controls above described for the clutch, brake and transmission, and also employing the bulldozer control lever 121, bulldozing operations can be effectively carried out. The primary purpose of the machine, however, is to gather and yard logs. The line 81 and winch 87 may be employed to bring logs to the tractor and, during such operation, the dozer blade 62 may be lowered to engage the ground or any stationary object thereon to maintain the machine in position while a log is being drawn thereto by the winch 87. Where the machine can directly approach the ends of such logs, the lower edge of the dozer blade can be inserted beneath a log end and then raised to raise such end of the log so as to assist in placing the winch line 81 about the log or in placing a choker line about the log. In any event, one or more logs, either held by the winch line 81 or by choker lines, may be brought into the position shown in Fig. 1 by conjoint use of the winch 87 and the dozer blade 62. The log or logs can then be towed with one end of the log or logs supported on the dozer blade and held in position with the line 81. During such transportation of the log, the operator's seat 108 is reversed from the position shown in Figs. 1 and 3 and the steering wheel 111 and associated truck controls are employed. The type of dozer blade shown, i. e., one having a lower edge portion extending outwardly and downwardly at an angle to the main portion of the blade, is particularly suitable for logging operations since such lower edge portion provides a support for the ends of logs during transportation and also provides a projecting portion for insertion under logs and lifting them during application of winch or choker lines to the logs.

I claim as my invention:

1. Logging apparatus comprising a steerable tractor having a front frame portion supporting an internal combustion engine and a rear frame portion connected to said front frame portion for movement about both a vertical axis and a horizontal axis extending longitudinally of said tractor, a pair of laterally disposed wheels supporting said front frame portion and a second pair of laterally disposed wheels supporting said rear frame portion, means to drive all of said wheels from said engine, a vertically movable dozer blade carried by said rear frame portion, a log arch carried on said rear frame portion and having a fair-lead for a winch line, said fair-lead being positioned above said dozer blade, a winch also carried by said rear frame portion and having a drum for said line, and means for supplying power from said engine to said winch to drive said drum.

2. Logging apparatus comprising a steerable tractor having a front frame portion supporting an internal combustion engine and a rear frame portion pivotally connected to said front frame portion for movement about both a vertical axis and a horizontal axis extending longitudinally of said tractor, a pair of laterally disposed wheels supporting said front frame portion and a second pair of laterally disposed wheels supporting said rear frame portion, power means for pivoting said rear frame portion relative to said front frame portion to steer said tractor, mechanical means to drive all of said wheels from said engine, a vertically movable dozer blade carried by said rear frame portion, a log arch carried on said rear frame portion and having a fair-lead for a winch line, said fair-lead being positioned centrally above said dozer blade, a winch also carried by said rear frame portion and having a drum for said line, and means for mechanically supplying power from said engine to said winch to drive said drum.

3. Logging apparatus comprising a steerable tractor having a front frame portion supporting an internal combustion engine and a rear frame portion connected to said front frame portion for movement about both a vertical axis and a horizontal axis extending longitudinally of said tractor, a pair of laterally disposed wheels supporting said front frame portion and a second pair of laterally disposed wheels supporting said rear frame portion, means to drive all of said wheels from said engine, a vertically movable dozer blade carried by said rear frame portion and extending laterally beyond said rear wheels on both sides, a log arch carried on said rear frame portion and having a fair-lead for a winch line, said fair-lead being positioned centrally above said dozer blade, said arch being adjustable to adjust the height of said fair-lead relative to said dozer blade, a winch also carried by said rear frame portion and having a drum for said line, power means for raising and lowering said dozer blade, and means for supplying power from said engine to said winch to drive said drum.

References Cited in the file of this patent

UNITED STATES PATENTS

| | | |
|---|---|---|
| 2,691,451 | Westfall | Oct. 12, 1954 |
| 2,710,167 | Sandland | June 7, 1955 |
| 2,713,218 | Dyer | July 19, 1955 |